Nov. 3, 1931.  W. A. UTTZ, SR  1,829,914
DISPENSING AND ADVERTISING CABINET
Filed Oct. 19, 1929    6 Sheets-Sheet 1

Inventor
W. A. Uttz, Sr.

By Robb & Robb
Attorneys

Nov. 3, 1931.   W. A. UTTZ, SR   1,829,914
DISPENSING AND ADVERTISING CABINET
Filed Oct. 19, 1929   6 Sheets-Sheet 2
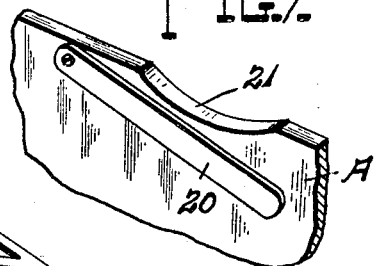
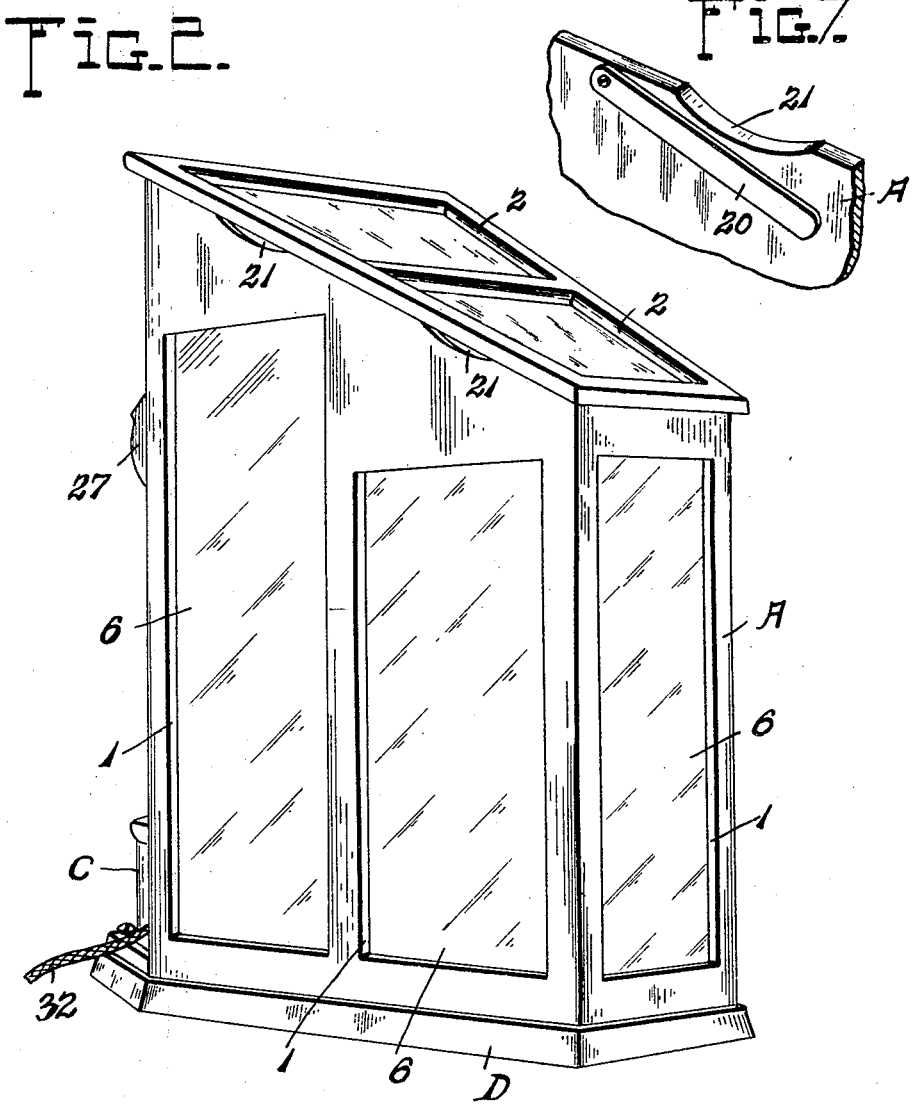
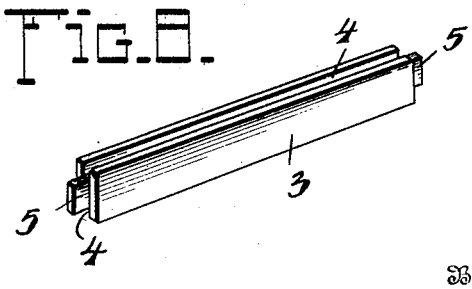
Inventor
W. A. Uttz, Sr.
By Robert Cobb
Attorneys Nov. 3, 1931.  W. A. UTTZ, SR  1,829,914
DISPENSING AND ADVERTISING CABINET
Filed Oct. 19, 1929  6 Sheets-Sheet 3

Inventor
W. A. Uttz, Sr.

By Robbs Robb
Attorneys

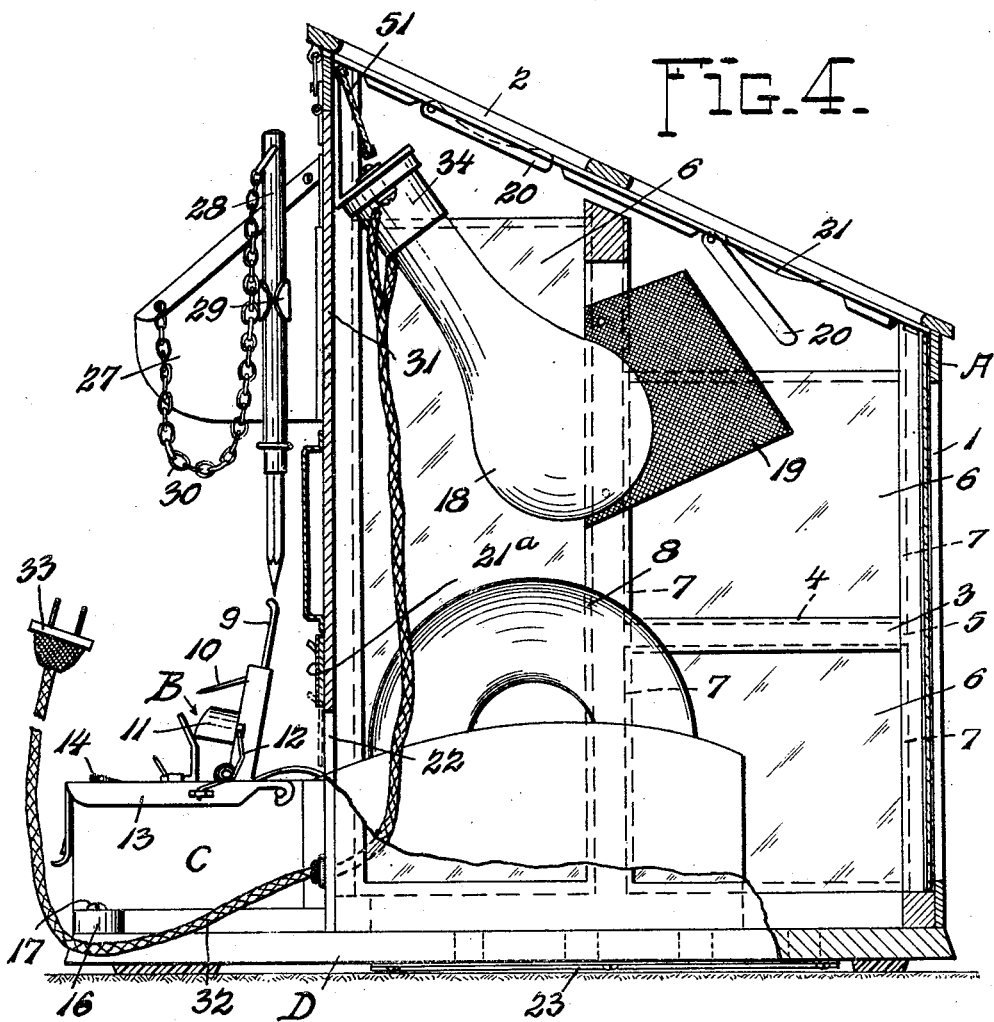
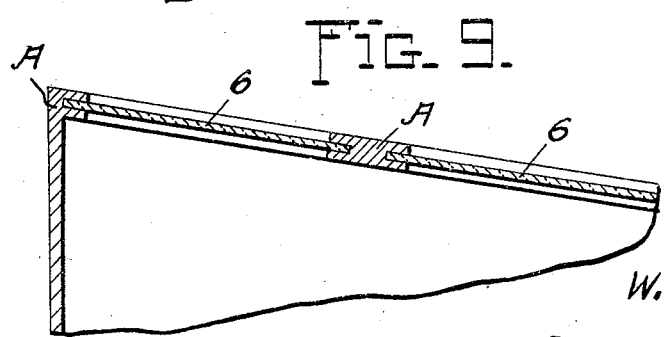

Nov. 3, 1931. W. A. UTTZ, SR 1,829,914
DISPENSING AND ADVERTISING CABINET
Filed Oct. 19, 1929 6 Sheets-Sheet 5

Inventor
W. A. Uttz, Sr.
By Robb & Robb
Attorneys

Nov. 3, 1931. W. A. UTTZ, SR 1,829,914
DISPENSING AND ADVERTISING CABINET
Filed Oct. 19, 1929 6 Sheets-Sheet 6

Inventor
W. A. Uttz. Sr.
By Robert Robb
Attorneys

Patented Nov. 3, 1931

1,829,914

UNITED STATES PATENT OFFICE

WILLIAM A. UTTZ, SR., OF CLEVELAND, OHIO

DISPENSING AND ADVERTISING CABINET

Application filed October 19, 1929. Serial No. 400,880.

My present invention has to do primarily with dispensing cabinets of the type at present utilized for dispensing adhesive tape and useful primarily in stores for facilitating the wrapping of packages. My invention involves in its broader phase of construction, the combining of a service cabinet structure with an advertising cabinet structure such that the two practically form a unit.

Tape dispensing cabinets of the kind I refer to, being useful in stores, afford special advantage when combined with an advertising cabinet structure because the dispensing device is always located in a prominent place where it is used, and when associated with advertising features provides a valuable advertising adjunct as regards the space equipped with advertising matter.

From many years of experience in the development and manufacture of the roll tape dispensing cabinets, I have observed that in certain portions of the country climatic conditions are such that at times during the year, the adhesive tape dispensed from my cabinets is affected by moisture, and has a tendency to stick in its rolled form, doubtless due to the penetration of the moisture between the layers of the tape in the roll.

In the carrying out of my present invention, it is necessary to utilize lights within the cabinet structure or unit, in order to obtain the proper display of advertisements applied to the advertisement panels mounted on the cabinet. Electric lights are the most convenient means of lighting the cabinet from the interior, and I have so designed my combined dispensing and advertising device as to very advantageously employ the lighting means in the cabinet as a heating means for the roll paper adhesive tape such that the latter will not be affected by changing atmospheric conditions, and its utility interfered with for the reason previously stated.

In conjunction with the lighting means which I employ as a heating means as well, I provide a screen to evenly distribute the heat throughout the cabinet and to prevent overheating of the advertisements. I also utilize certain ventilation control means for my cabinet casing so that when the invention is being used in the summertime, heat may be permitted to escape from the casing, whereas in the wintertime, it may be more fully retained, this being especially desirable where the unit is used in stores that may be more or less open to the atmosphere.

Another practical difficulty which I have ascertained from previous experience in the production of adhesive tape dispensing machines, resides in the fact that the adhesive applied to the tape is ofttimes of such a nature that it does not produce the best adhesion when moistened by cold water. It will be understood that tape dispensing machines of the kind I refer to customarily have a water supply receptacle to feed water in some suitable manner to a moistening device with which the tape contacts. The fact that cold water does not act as a complete solvent of the adhesive on the tape in the tape moistening operation is doubtless due to the particular properties of the adhesive itself. At any rate, I have found that the heating of the water aforesaid enables me to obtain a more efficient operation of my tape dispensing feature of my invention, and with the above in view, I utilize the heat from the lights within my cabinet unit as a means for warming the receptacle containing the tape moistening water and under these conditions, my machine in so far as its tape dispensing features are concerned, is of increased effectiveness for the purposes for which it is designed.

Another and more subsidiary feature of my invention resides in the provision of a water receptacle mounted in a removable member upon the cabinet structure for facilitating the cleaning of the receptacle and for additionally facilitating access to the interior of the cabinet itself wherein the tape roll is mounted in a removable manner.

Another more specific feature of the invention resides in a cooperative arrangement of an entrance door to the cabinet in conjunction with a knife carrier forming a part of the tape dispensing mechanism.

Still another detail of the invention resides in the provision of a specific type of panel bar adapted to cooperate with translucent panels mounted in the frame of the cabinet.

With the foregoing features of my invention in mind, I refer to the accompanying drawings and description in which the same reference characters refer to the same parts, the invention being illustrated by various figures characterized, as follows:—

Figure 2 is a view similar to Figure 1, but looking at the cabinet in an opposite direction or from the opposite end.

Figure 4 is a vertical longitudinal sectional view through the main structure of the cabinet with the exception particularly of the water receptacle and associated tape guiding and cutting parts.

Figure 7 is a detailed perspective view of a ventilation control valve such as used at the top of the cabinet.

Figure 8 is a detailed perspective view of one of the panel bars disposed intermediate advertising panels where a series of these are provided to break up a larger space or panel opening of the cabinet or casing.

Figure 9 is a cross sectional view bringing out more clearly how the panel bars cooperate in supporting the advertising panels.

Figure 1:
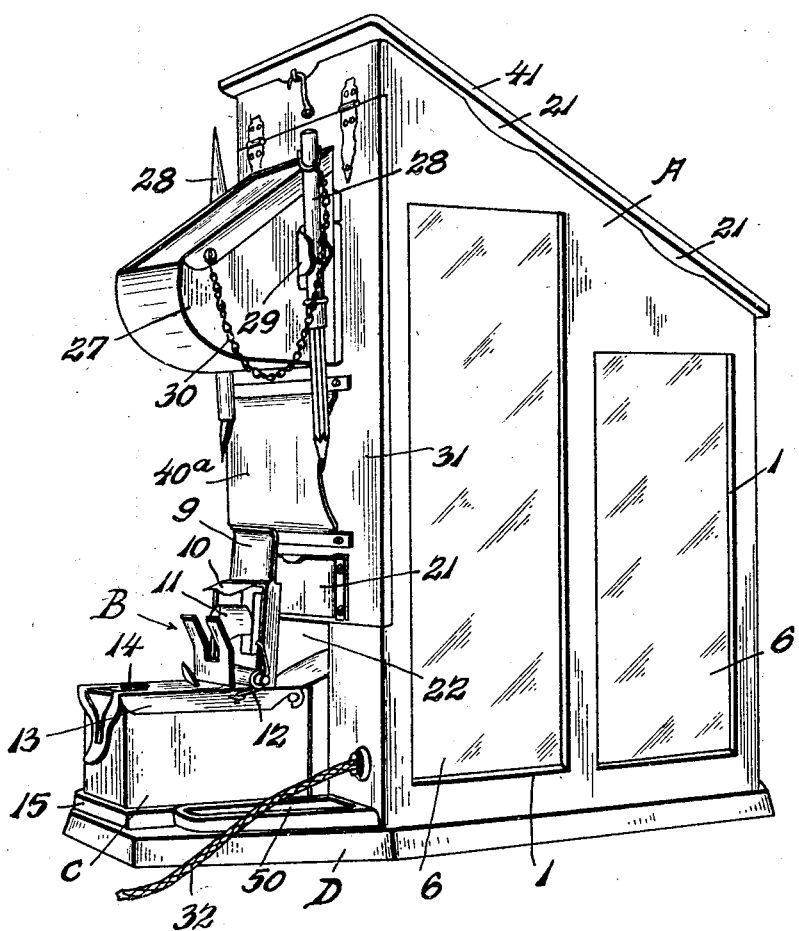
Figure 1 is a perspective view of a combination advertising and tape dispensing cabinet embodying my invention.

Passing now to the specific construction of my invention as illustrated in its different adaptations, and bearing in mind that I do not wish to be limited to the exact form or design of the parts as shown, either in respect to the cabinet structure itself or the roll tape dispensing features, I have illustrated in Figure 1 a preferred construction. A denotes the casing of my combination cabinet, the same being of somewhat rectangular form, but preferably tapering toward the front end, shown more fully in Figure 2. The casing A is equipped with panel openings 1 at the sides and panel openings 2 at the top. In these panel openings are disposed translucent panels, preferably glass, the surfaces of which are to be used as advertising spaces. To this end the panels may be printed, decorated or otherwise supplied with advertising matter, and the spaces of the panels will be divided or used in their entirety, being sold as advertising spaces at prices dependent upon the size purchased by an advertiser. Where the larger panels 1, as shown in Figures 1 and 2 are to be divided into several advertising spaces, I may utilize panel bars 3 shown in Figure 4, the upper and lower edges of which are grooved at 4 to receive the glass or translucent panel members at the proper edges of the latter, the said bar being equipped with end supporting extensions 5 to operate in the grooves or channels with which the side walls and top walls of the cabinet casing A are equipped.

The action of the panel bars 3 will be quite evident upon reference to Figure 4 wherein the glass panels are illustrated at 6. The side grooves which receive the panels are designated at 7, these grooves also receiving the end extensions 5 of the bar 3. The interior of the casing A provides a service department, in which is mounted, so to speak, the adhesive tape roll 8, the tape of which feeds outwardly through an opening in the rear of the casing to the dispensing mechanism generally shown at B in Figures 1 and 4. As the dispensing mechanism is not material to the present invention, except in relation to the mounting of the water receptacle C I shall not go into detail in regard to the construction of said mechanism except to say that I provide a suitable knife carrier 9 having the tape cutting knife 10 and the tab cutting knife 11, the carrier 9 being upraised normally by the spring means 12. The receptacle C has a top plate 13, above which projects the moistening brush 14 to which water is fed from the supply in the receptacle C.

In my construction as shown in Figure 1, I have mounted the receptacle C removably upon the base D of the cabinet and to prevent displacement of the receptacle the base D is flanged as at 15 to provide a pocket or space in which the receptacle C will be held quite firmly.

Referring again to Figure 4, it will be observed that within the casing A and above the tape roll 8, I have provided the light 18 preferably in the form of an electric incandescent globe so arranged in the casing as to illuminate the latter excellently throughout its interior, the light rays emanating from the casing A through the translucent panels 6 to thus display the advertising upon said panels. The light 18 is so designed as to provide a considerable amount of heat, aside entirely, from its lighting function and this heat will act upon the roll 8 in such a manner as to prevent the roll from being affected by moisture in the air with the resultant disadvantages presented at the commencement of this specification.

The layers of the tape of the roll 8 will not have a tendency to become sticky and will therefore enable the feeding out of the tape to take place without the possibility of adhesion between the layers, or sticking such as would have a tendency to tear the tape or supply to the dispensing parts tape that has not a full adhesive surface upon one side.

In order that the heat in the casing A, generated from the light 18 may be evenly distributed therein, I provide a copper screen heat absorber 19 suitably mounted in the casing, and so arranged that the heat rays will be prevented from overheating the advertisements and cause damage thereto. The copper screen also prevents excessive illumination of certain portions of the advertising matter.

Figure 6:
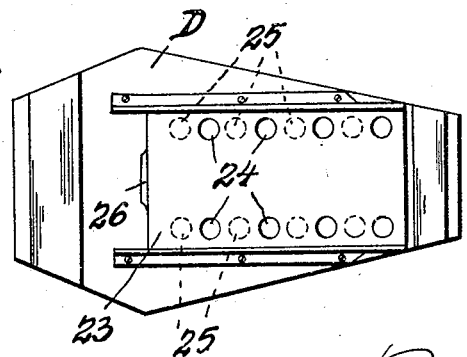
Figure 6 is a bottom plan view of the cabinet showing an air circulation control valve or plate, and its mounting.

At the top of the casing A, as shown best perhaps in Figure 4, are pivoted valves 20 cooperative with ventilating openings 21 in the side walls of the casing just beneath the top structure. These valves may be opened or closed, dependent upon the temperature of the place in which the cabinet is used, to control the amount of heat within the casing A. To the same end, I utilize at the rear of the casing a vertically movable valve plate 21a which may be lowered so as to close the space or opening 22 between the tape fed from the roll and the rear wall structure of the cabinet. Additionally, upon the bottom or base D of the cabinet, as shown in Figure 6, I provide a ventilation control valve 23 having openings 24 near its opposite edges which openings are adapted to register with openings 25 in the bottom or base structure D, and to the extent that the openings 24 and 25 register more or less, the circulation of fresh air upwardly through the cabinet will be increased or decreased respectively. A finger piece 26 is provided on the valve plate 23.

The foregoing deals with the preferred embodiments of my invention, and I refer generally to the fact that at the upper rear portion of the cabinet of the casing A I provide a pad holder 27 for paper upon which writing may be placed.

Suitable pencils 28 and holders 29 therefor are likewise provided and kept from removal by chains 30 in a self evident manner. The paper pad holder is mounted upon a rear door 31 preferably, which door may be opened in order to facilitate access to the interior of the casing for the removal and replacement of the tape roll 8, the light bulb 18, and for manipulation of the valves 20. An electric light cord or lead 32 extends into the casing A from the rear, as shown in Figures 1 and 4 clearly, and is equipped with a plug switch 33 at the free end and connected with the supporting socket 34 in which the electric light bulb 18 is mounted, see Figure 4.

Figure 11:
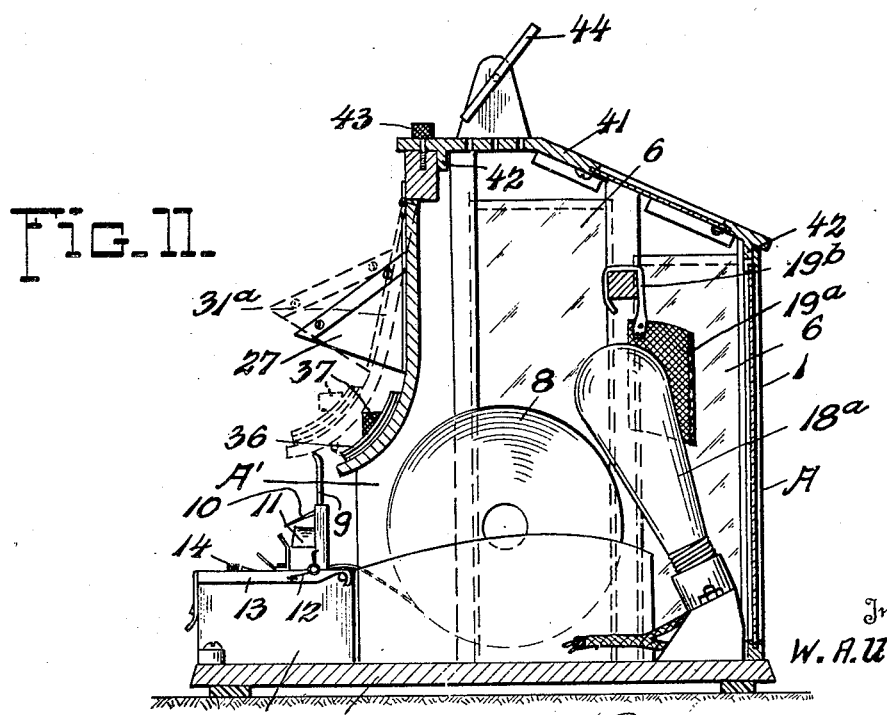
Figure 11 is a vertical sectional view of the modified construction shown in Figure 10.
Figure 10:
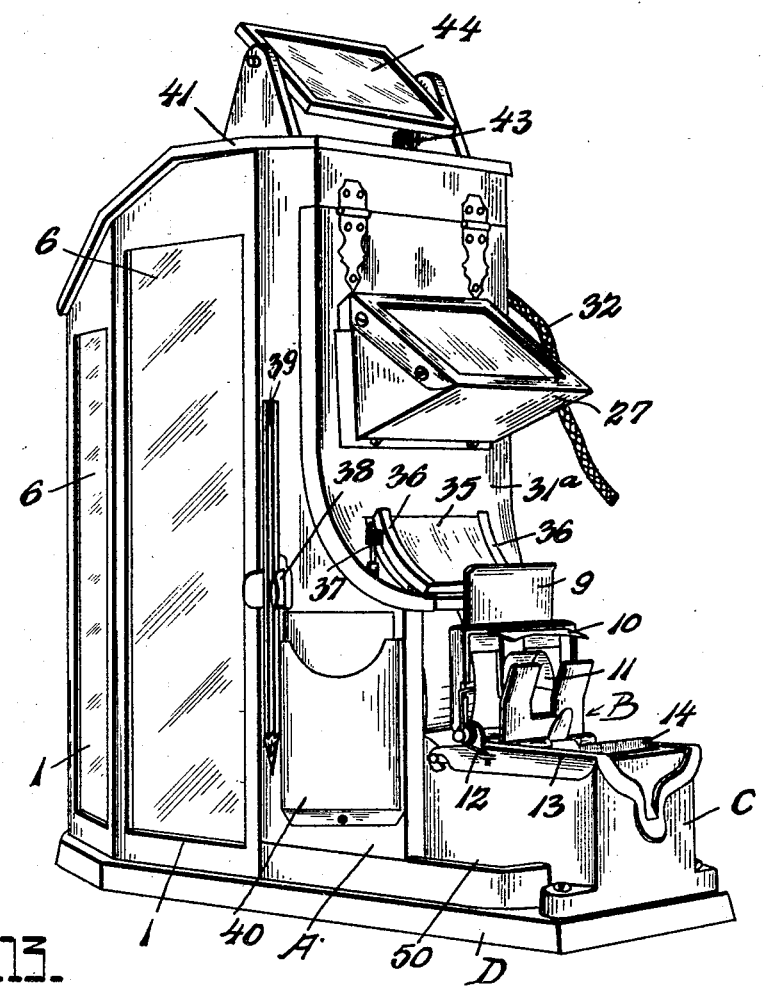
Figure 10 is a perspective view showing a modified embodiment of the invention.

I pass now to a modification of my invention, as shown in Figures 10 and 11 primarily, said modification utilizing a somewhat different type of casing wherein the rear door 31a is curved outwardly at its base portion to conform with the rear extension A' of the casing A. This curved portion at the lower portion of the door 31a may also carry a paper pad 35, suitably mounted in guides 36, and the door 31a will be held closed by a pin 37 arranged to interlock with the lower portion or extension A' of the casing A in an obvious manner. In this form of my invention, I utilize a pencil support 38 which is shown as holding a pencil 39, arranged somewhat differently from the construction in the first figures of my drawings, as above described.

The pencil support 38 may be duplicated at opposite sides of the rear of the casing A. Likewise, a card or blotter holder 40 is provided adjacent to each pencil support 38, all with a view of facilitating the handling of transactions in a store in which my combined advertising and dispensing cabinet is employed. According to the arrangement of the parts in Figure 11, the door 31a may be held open by resting upon the knife carrier 9 at the upper end of the latter, such temporary holding action being desirable usually when a replacement of the tape roll 8, or similar action respecting the light bulbs or adjacent parts is being attended to. In Figures 10 and 11, I preferably use duplicate light bulbs 18a and associate with them a removably mounted screen 19a, the purpose of which will be evident from the foregoing description.

At the top of the casing of my cabinet, I mount a small mirror 44 which is carried by the top section 41, the latter being removable bodily when desired. The top section or member 41 is equipped with flanges 42 fitting within the side walls and front and rear walls of the cabinet so as to center the part 41 properly, its displacement or removal being prevented normally by the screw pin 43, shown best in Figure 11.

Figure 5:
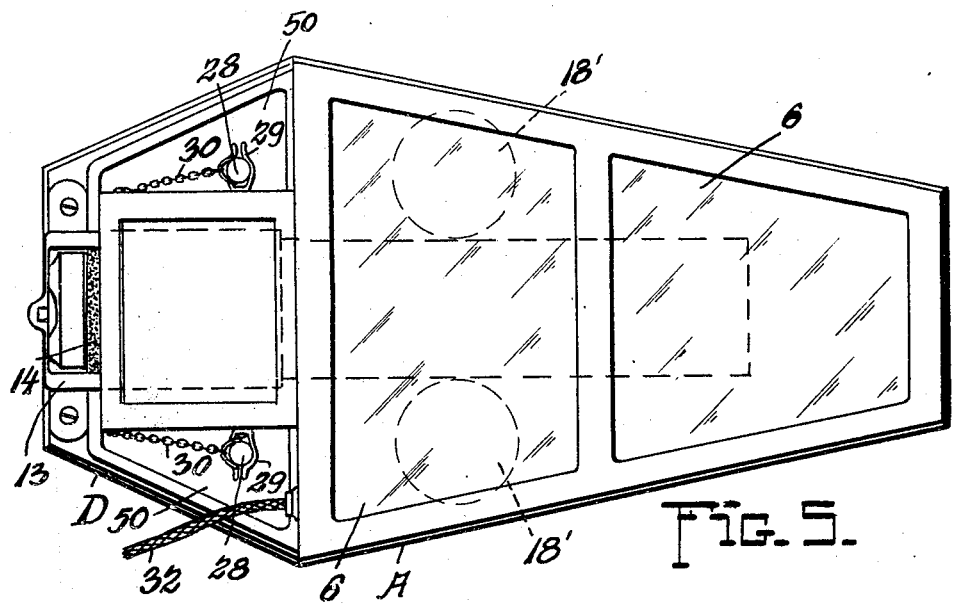
Figure 5 is a top plan view of my cabinet construction modified only in respect to the location of the lights which are disposed in the manner shown in Figure 11.

In Figure 5 I have illustrated an arrangement of the light bulbs 18' showing how they would be mounted when two bulbs are employed instead of one as shown in Figure 4.

As shown in Figure 11, the copper heat screen 19a is detachably mounted upon and supported by hook means 19b secured to the upper portion of the screen.

Figure 12:
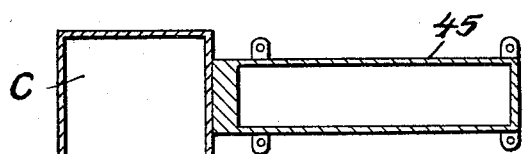
Figure 12 is a reduced view of a divided moistening or water receptacle and tape roll holder.
Figure 3:
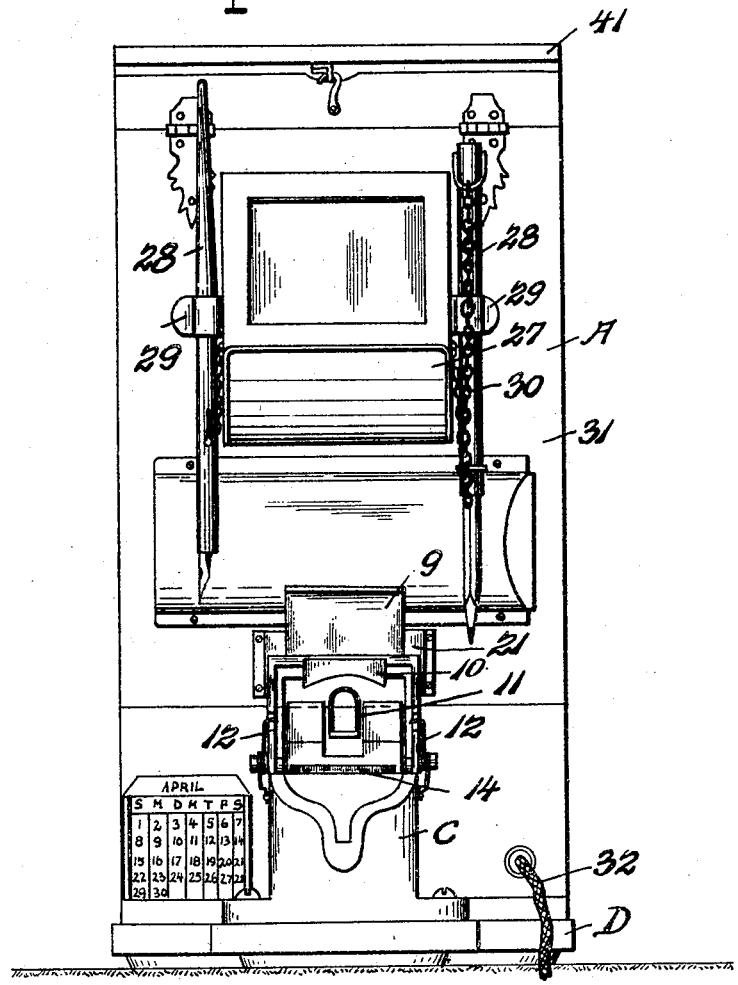
Figure 3 is a rear elevation of the cabinet considering the tape dispensing features as mounted at the rear, as distinguished from the advertising structure disposed at the sides and front and top of the device.

In Figure 12, I have shown the holder 45 for the tape roll 8, as of the form of a receptacle associated with the water receptacle C and while the two are separable they are in contact with one another for a purpose. This purpose is to enable the heat of the light or lights within the casing A to act upon the parts 45 and C so they will be warmed, and the said parts being in metallic contact, the heat will be communicated to the receptacle C sufficiently that the water in the latter will likewise be warm. This ensures that the warm water will act upon the tape through the moistening device 14, and more thoroughly dissolves the adhesive and bring into action the adhesive properties thereof.

Figure 13:
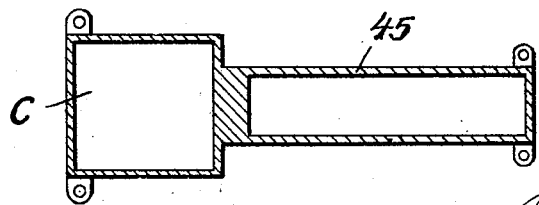
Figure 13 is a similar view to Figure 12, showing the moistening or water receptacle and tape roll holder in an integral form.

The construction of Figure 12 is that used in Figure 1. In Figure 13, I have provided an illustration of the water receptacle and tape roll receptacle, wherein they are integral with one another, and of the type more fully illustrated in Figure 11. The integrality of construction of these parts facilitates their removal together, and the warming action of the water receptacle C.

In the drawings where parts are substantially the same in the various figures, the reference characters are identical even though the constructions in such various figures may not themselves be wholly identical, the difference in the parts' construction being specifically indicated herein.

From the foregoing, it will be obvious that I have provided a display cabinet for advertising purposes combined with an adhesive tape dispensing structure which may be especially useful in stores, and which offers very practical advantages so far as the efficiency of both the advertising and dispensing features are concerned.

Integral trays 50 for paper clips are provided at opposite sides of the water receptacle C.

In Figure 1, the blotter or card holder is designated 40a.

In the preferred form of the invention I have shown a mirror 51 placed within the casing A to direct the light rays to parts of the advertising matter which would be otherwise poorly illuminated. While this mirror in the position shown may not receive rays of light direct from the lamp 18, yet it does receive light rays indirectly and serves to eliminate shadows from the advertising matter and equalize the light reflections.

Having thus described my invention, what I claim as new and desire to secure by Letters Patent of the United States, is:—

1. In a combined advertising and dispensing cabinet, the combination of a casing provided with translucent advertising panels, tape roll holding means in the said casing, tape dispensing mechanism associated with the tape roll holding means, and lighting means within the casing arranged so that the heat thereof will be received by the tape roll mounted in the tape roll holding means, said lighting means maintaining the tape roll in dry condition.

2. In a combined advertising and dispensing cabinet, the combination of a casing provided with translucent advertising panels, tape roll holding means in the said casing, tape dispensing mechanism associated with the tape roll holding means, and lighting means within the casing arranged so that the heat thereof will be received by the tape roll mounted in the tape roll holding means, the tape dispensing mechanism including a water receptacle so arranged that the heat of the lighting means within the casing will warm the water receptacle.

3. In a combined advertising and dispensing cabinet, the combination of a casing provided with translucent advertising panels, tape roll holding means in the said casing, tape dispensing mechanism associated with the tape roll holding means, and lighting means within the casing arranged so that the heat thereof will be received by the tape roll mounted in the tape roll holding means, and a device for causing the heat of the lighting means to be evenly distributed throughout the casing.

4. In a combined advertising and dispensing cabinet of the class described, a casing, tape roll holding means therein, tape dispensing means associated with the casing and comprising a water receptacle, said casing including advertising panels, and means for lighting the interior of the casing arranged so that heat generated therefrom may cooperate with a tape roll in the holding means and with the water receptacle for warming the tape roll and said water receptacle.

5. In a device of the class described, in combination, a casing dispensing adhesive tape, tape roll holding means within the casing, a water receptacle associated with the casing for enabling the moistening of the tape, and heating means associated with the casing for warming a tape roll supported by the tape roll holding means and for warming the water receptacle so that water in the latter will be slightly heated to facilitate its action in connection with the adhesive of the tape of the tape roll.

6. In a dispensing cabinet of the class described, in combination, a casing, tape roll supporting means within the casing, adhesive tape dispensing means associated with the casing, and means within the casing for heating a tape roll supported by the holding means aforesaid, said heating means maintaining the same in a dry condition.

7. In a dispensing cabinet of the class described, in combination, a casing, tape roll supporting means within the casing, adhesive tape dispensing means associated with the casing, means within the casing for heating a tape roll supported by the holding means aforesaid and for lighting the interior of the casing, and means within the casing for evenly distributing the heat from the light throughout the casing.

8. In a dispensing cabinet of the class described, in combination, a casing, tape roll holding means therein, adhesive tape dispensing means associated with the casing and including a water receptacle, and incandescent means for heating the water in the said receptacle.

9. In a dispensing cabinet of the class described, in combination, a casing, tape roll holding means therein, adhesive tape dispensing means associated with the casing and including a water receptacle, and means for heating the water in the said receptacle, comprising a light disposed in the casing, and means for evenly distributing the heat and light therefrom throughout the casing.

10. In a dispensing cabinet of the class described, in combination, a casing, tape roll holding means therein, adhesive tape dispensing means associated with the casing and including a water receptacle, and means for heating the water in the said receptacle, comprising a light disposed near said water receptacle.

11. In a dispensing cabinet of the class described, in combination, a casing, tape roll holding means therein, adhesive tape dispensing means associated with the casing and including a water receptacle, and means for heating the water in the said receptacle, comprising a light disposed in the casing, means for evenly distributing the heat of the light throughout the casing, and valves carried by the casing for controlling the circulation of air therethrough and the amount of heat maintained in the casing.

12. In a dispensing cabinet of the class described, in combination, a casing, tape roll holding means therein, adhesive tape dispensing means associated with the casing and including a water receptacle, and means for heating the water in the said receptacle, comprising a light disposed in the casing, means for evenly distributing the heat of the light throughout the casing, and valves carried by the casing for controlling the circulation of air therethrough and the amount of heat maintained in the casing, said valves being located at the top of the casing, said top of the casing having ventilating openings controlled by the valves, and other valve means at the bottom of the casing controlling openings in the latter.

13. In a cabinet of the class described, a casing, a tape roll holder in the casing, tape roll dispensing means associated with the casing and said holder and including a knife carrier, a door for the casing arranged to permit access to the interior thereof, and means supporting the door so that it may be held open temporarily by contact with the knife carrier.

14. In a cabinet of the class described, in combination, a casing provided with translucent advertising panels, a tape roll holder therein, adhesive tape dispensing means associated with said holder comprising a receptacle, light means within the casing to provide light for the translucent panels, and for generating heat, said light means being so disposed that its heat will warm the tape roll and the water receptacle aforesaid, the casing having valved openings at its upper portion, and provided with valved openings at its base portion to control circulation of air therethrough.

15. In a cabinet of the class described, in combination, a casing provided with translucent advertising panels, a tape roll holder therein, adhesive tape dispensing means associated with said holder comprising a receptacle, light means within the casing to provide light for the translucent panels, and for generating heat, said light means being so disposed that its heat will warm the tape roll and the water receptacle aforesaid, the casing having valved openings at its upper portion, and provided with valved openings at its base portion to control circulation of air therethrough, and means removably mounting the water receptacle upon the base, and in proper association with the casing substantially as described.

16. In a dispensing cabinet of the class described, in combination, a casing, tape roll holding means therein, adhesive tape dispensing means associated with the casing and including a water receptacle, means for heating the water in the said receptacle, comprising a light disposed in the casing, means for evenly distributing the heat therefrom throughout the casing, and a device for reflecting light to poorly illuminated portions of the advertising matter and evenly distributing the same.

In testimony whereof I affix my signature.

WILLIAM A. UTTZ, Sr.